United States Patent [19]

Babcock

[11] 4,090,399
[45] May 23, 1978

[54] LOAD MEASURING GAGE

[75] Inventor: Clarence O. Babcock, Lakewood, Colo.

[73] Assignee: The United States of America as represented by the Secretary of the Interior, Washington, D.C.

[21] Appl. No.: 493,295

[22] Filed: Jul. 31, 1974

[51] Int. Cl.² .............................................. G01B 5/30
[52] U.S. Cl. ............................... 73/88 F; 73/141 AB; 116/DIG. 34
[58] Field of Search ............. 73/88 R, 88 F, 141 AB; 116/DIG. 34; 85/62; 151/36, 38

[56] References Cited
U.S. PATENT DOCUMENTS

| | | | |
|---|---|---|---|
| 2,725,843 | 12/1955 | Koski | 116/DIG. 34 |
| 2,830,486 | 4/1958 | Dillon | 116/DIG. 34 |
| 3,060,731 | 10/1962 | Adise | 73/88 F |

*Primary Examiner*—Harry N. Haroian
*Attorney, Agent, or Firm*—Thomas Zack; Donald A. Gardiner

[57] ABSTRACT

A load measuring gage generally shaped like a conventional split ring washer. In the center opening of the gage a shaft, which mounts the device whose load is to be measured, may extend through the washer. The opening for the washer is cut diagonally so that the loading and unloading forces acting upon it are collinear thereby reducing friction that resist its opening and closing to a minimum. This is accomplished by orienting the angle between the split ring surface and adjacent bearing surface to be between 50° and 62°. A force indicating pointer and scale can be attached to the washer to inform observers visually of variations in the force applied to the gage. In this way if the tension on a mine rock bolt is being measured, observers may safely be informed of the force on the in situ bolt from a distance.

2 Claims, 10 Drawing Figures

PRIOR ART

PRIOR ART

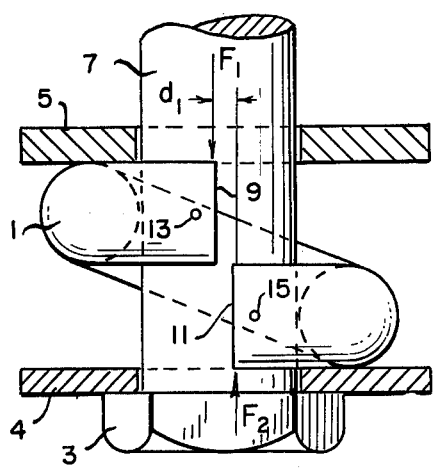
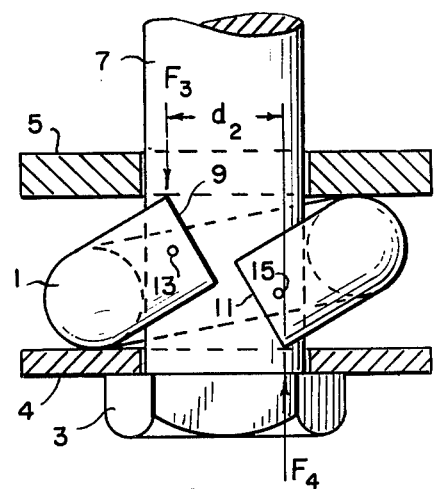
FIG. 1a. PRIOR ART
FIG. 1b. PRIOR ART
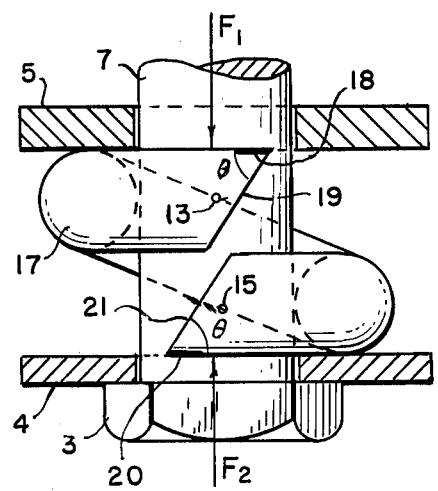
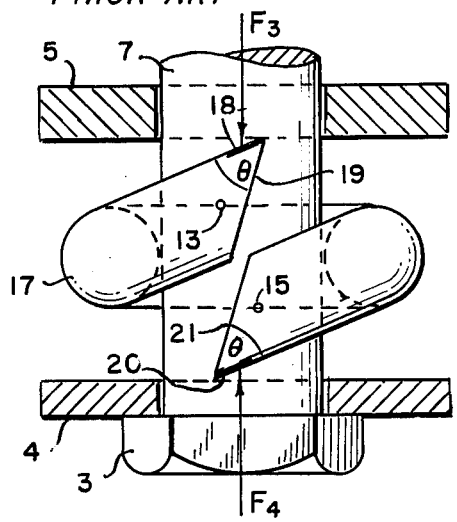
FIG. 3a.
FIG. 3b.
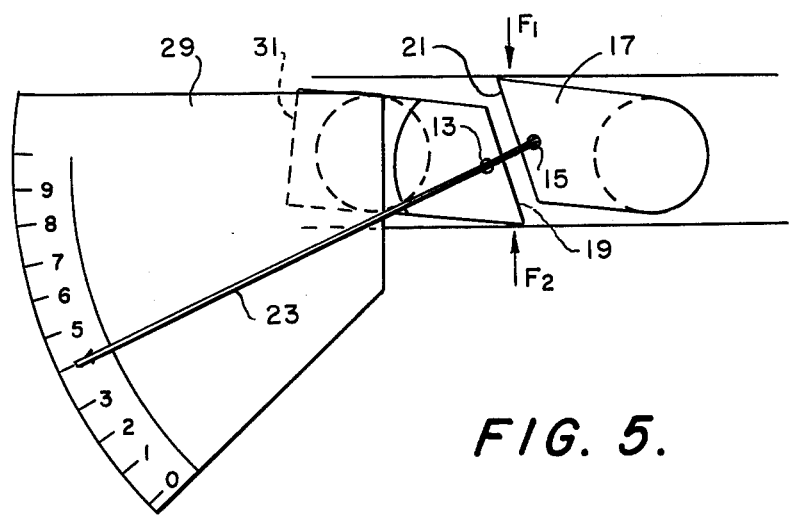
FIG. 5.

LOAD MEASURING GAGE

BACKGROUND OF THE INVENTION

1. Field of the Invention

The invention relates to an improved tension indicating gage washer.

2. Description of the Prior Art

For some time now helical springs or lock washers have been used to measure the tension on a bolt. This is particularly true of the mining field where the tension on in situ mine roof bolts is to be determined. According to a recent report from the Rock Action Committee of the American Mining Congress, friction between the tightened washer and the bearing parts of the rock bolt has usually required about 40 percent of the installed tension to be released before the deformable washer shows an indication of opening. It is extremely dangerous to release this high percentile of tension when the bolt is supporting an overburden in a mine, especially in old mine workings that are being reopened for further use.

Split ring washers with indicator arms used as load gages are known as shown in U.S. Pat. Nos. 3,060,731 to H. H. Adise, and 3,534,651 to J. G. Belfiglio. With many of these types of washers the washer is either permanently deformed by the forces acting on it or it requires the releasing of a large amount of the bolt holding tension before an accurate indication of the load can be obtained. In my invention a simple, inexpensive, split ring washer is used as a load gage which can indicate a 10% change in tension without being permanently deformed or requiring the release of a large amount of initial tension.

SUMMARY OF THE INVENTION

My invention is a split ring load gage that is diagonally cut in cross-section at an angle of 50° to 62° for the split to provide for the collinear acting of the tensioning forces that are applied to the bearing surfaces over the split.

DESCRIPTION OF THE DRAWINGS

FIG. 1(a) illustrates how in the prior art forces initially act on the uncompressed split ring washer gage.

FIG. 1(b) shows how greater forces act on the FIG. 1(a) washer.

FIG. 3(a) describes how a preferred embodiment of my invention has forces working on it initially in an uncompressed state.

FIG. 3(b) is the FIG. 3(a) washer as greater forces act on it.

FIG. 5 is a side view of an indicating scale attached to the FIG. 3(a) gage.

Figure 2:
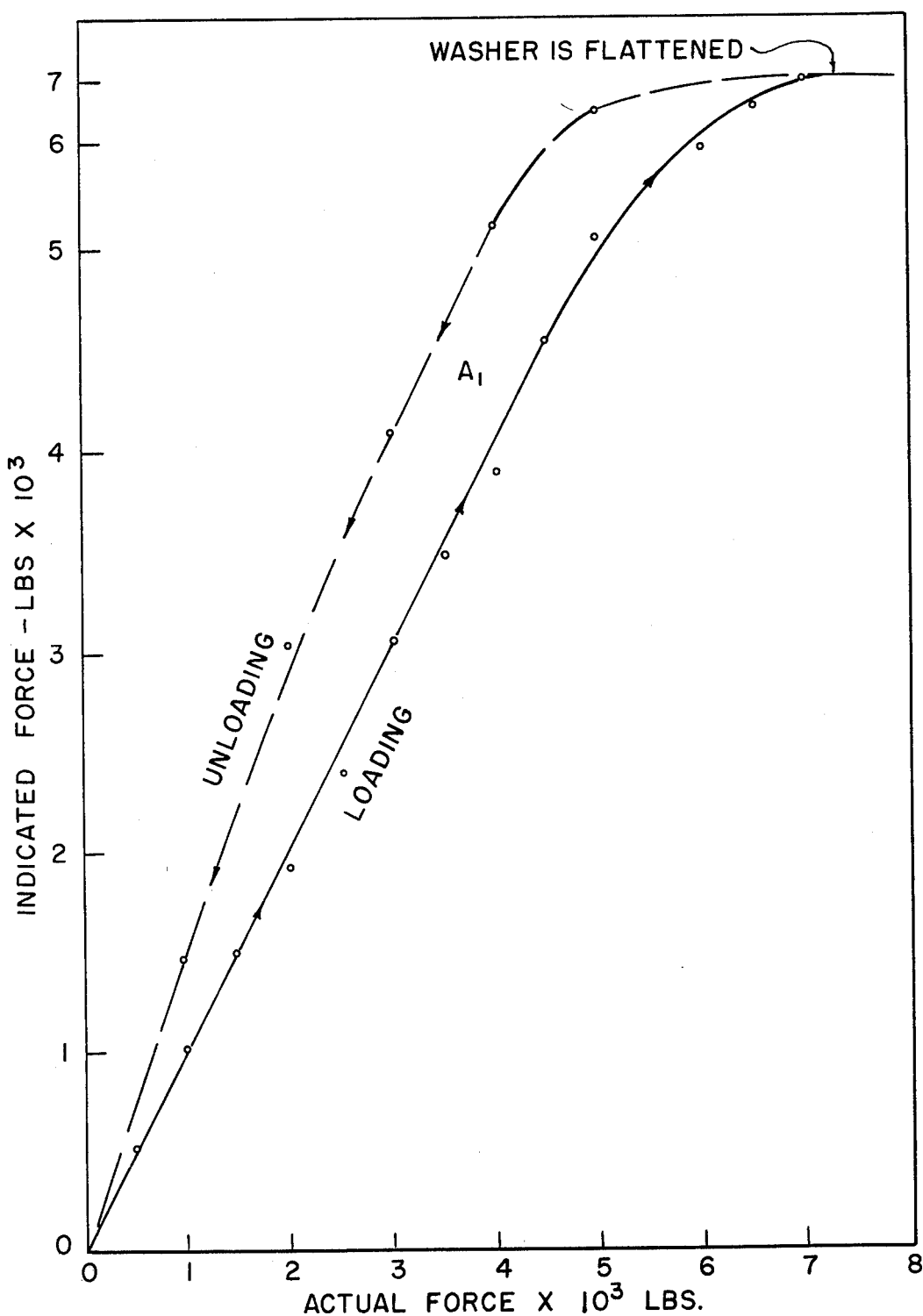
FIG. 2 is a typical prior art loading and unloading curve.

The prior art illustrating a split ring lock washer gage installed on a rock bolt is described with respect to FIG. 1(a) and FIG. 1(b). Usually, the lock washer gage 1 is mounted between a flat washer 4 on a tightening bolt 3 and the upper roof bearing plate 5 on the rock bolt shaft 7. As depicted, the large flat plate 5, which engages the surface of the mine roof, is shown in cross-section in FIGS. 1(a) and 1(b). Initially in FIG. 1(a) very slight amounts of compressive forces, $F_1$ and $F_2$, are exerted on the outer rounded bearing surfaces of the gage 1 and the two opposite adjacent flat surfaces 9 and 11 of the split faces appear generally vertical. In order to study the behavior of the washer, two holes 13 and 15 on opposite sides of the split surfaces may be used to fasten an indicating device as was done for the FIG. 2 graph.

FIG. 1(b) depicts the FIG. 1(a) gage after bolt 3 is tightened to increase the compressive forces from $F_1$ to $F_3$ and $F_2$ to $F_4$, respectively. It is important to note how these forces act on their bearing gage surfaces with respect to each other. In FIG. 1(a) $F_1$ and $F_2$ are slightly vertically offset from each other by distance $d_1$, thereby creating a small force moment arm with respect to themselves. When the opposing forces become greater ($F_3$ and $F_4$) as in FIG. 1(b), the horizontal distance $d_2$ between them also increases thus increasing the magnitude of the moment. One of the major problems my invention seeks to reduce is this magnitude since it is directly related to the amount of friction which must be overcome for the washer to recover its shape when unloaded. The two holes 13 and 15 were used in tests to evaluate the response of this washer.

FIG. 2 attempts to focus the problem area graphically by showing what might be termed a hysteresis curve of the washer. The $x$ and $y$ axes are both in force units (pounds) times $10^3$. The $x$ axis is the amount of actual force used to tighten the bolt. The $y$ axis has a scale to represent the amount of force indicated by the rotating pointer 23. Because of friction the indicated force when the bolt load is increasing is different than the indicated force when the bolt load is decreasing. If the increasing and decreasing reading are different and the direction of bolt load change is unknown the correct reading is unknown. The area $A_1$, between the actual loading readings represent the frictional effects previously noted in the prior art that should be kept to a minimum. For example, say $7 \times 10^3$ pounds of force are needed to fully tighten the washer tested until it is flattened. Then, it is not until $4.8 \times 10^3$ pounds of force that an unloading reading can be taken. In other words, $2.2 \times 10^3$ pounds of force ($7 \times 10^3 - 4.8 \times 10^3$) are needed simply to overcome the frictional forces tending to keep the washer flat. It should be apparent that by reducing the amount of frictional build-up the danger to persons attempting to determine the measurement of forces on the rock bolt washer are correspondingly reduced. Also, the readings obtained are more accurate.

Figure 4:
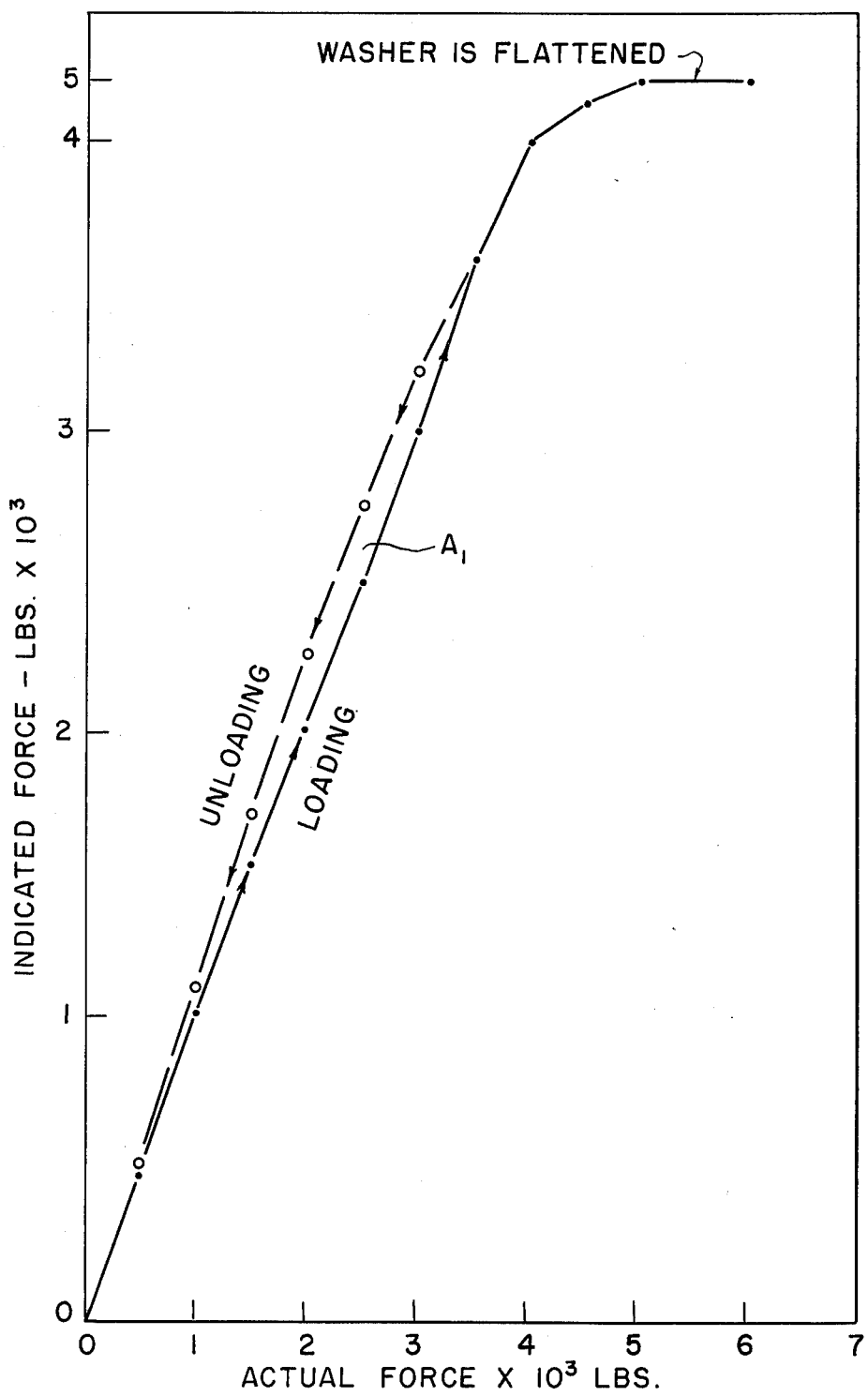
FIG. 4 is a typical graph of how the loading and unloading forces act on my invention.

FIGS. 3(a), 3(b), and 4 are analogous to the prior art FIGS. 1(a), 1(b), and 2, respectively, just described, except that they relate to an embodiment of any invention rather than the prior art. Parts that are exactly the same for FIGS. 1(a) and 1(b) as those for FIGS. 3(a) and 3(b) bear the same numbers or letters. These would include the bolt head 3, the bearing plate 5, the rock bolt shaft 7, the washer 4, the holes 13 and 15, and the distances $d_1$ and $d_2$, and the forces $F_1$, $F_2$, $F_3$ and $F_4$. The washer 17 has two generally flat parallel opposite surface faces 19 and 21 that are oriented at an angle $\theta$ with respect to their adjacent washer contact surfaces which engage the bearing plate and washer 4. Forces $F_1$ and $F_2$ of FIG. 3(a) illustrate how the washer would appear initially before appreciable compression takes place. It should be noted that $F_1$ and $F_2$ are acting collinearly and as a result the distance $d_1$ between them would be near zero. When the forces are increased to $F_3$ and $F_4$ as in FIG. 3(b), they still maintain their collinear relationship with distance $d_2$ now being still about equal to zero. Thus, in either event my invention has little or no force moment between the compressive forces. This effect is exactly the opposite of that performed by a conventional lock washer which attempts to create a large frictional build-up of forces to prevent the bolt from becoming loose.

FIG. 4 uses the same coordinates as the FIG. 2 graph except that it shows the observed experimental readings using my invention. Its readings were taken from a washer that was the same size as the readings from the FIG. 2 washer but with a smaller offset at the split ring portion. Two observations should be noted from this graph. First, the area $A_1$ between the loading and unloading force curves is much smaller than in FIG. 2 indicating a greater correspondence between these two force measurements. Second, the measurements for loading and unloading nearly coincide at the upper portion of the graph indicating almost a total absence of a built up of frictional forces to prevent the rotation of the bolt.

One of the most critical parameters which had to be determined is the angle $\theta$ that is formed by the washer bearing surface on one leg and the adjacent washer split face surface at the other leg. Experiments I have conducted show that for the force moment to be near zero the angle $\theta$ should be between 50° and 62° with 55° to 60° being the preferred range. The surface that forms the leg which bears against the load transmitting surface (plate 5 and flat washer 4 in FIG. 3(a)) is small compared to the total upper washer surface. To insure better contact these two bearing surfaces may each be flattened over a small area as represented by the numbers 18 and 20 in FIGS. 3(a) and 3(b).

As is conventional, the shaft 7 of the rock bolt has an earth anchor (not shown) on its upper end that expands as bolt head 3 is tightened. The washer is inserted between the plate and bolt head and compressed thereby to act as an auxiliary unit to measure load. These compressive forces cause the washer to deform proportional to the compressive load within the elastic limits of the washer material. Assuming this load on the washer is the same as that on the bolt, by measuring the load on the gage the bolt load is known. To determine the load by a visual inspection of the deformation various types of indicating devices may be attached to the gage.

Figure 6:
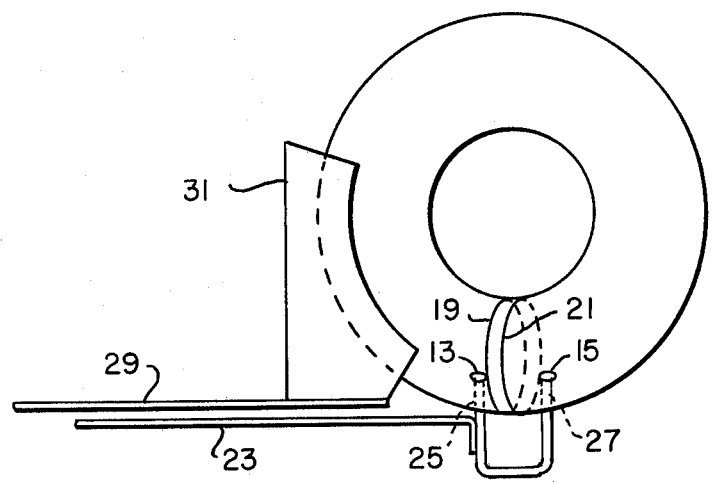
FIG. 6 is a top view of FIG. 5.

FIGS. 5 and 6 show one type of indicating device that can be used with the preferred embodiment of my invention or with the conventional prior art washer as was done to obtain the FIG. 2 data. The indicating device consists of a elongated rigid generally straight wire pointer 23 having an end U-shaped section with two leg terminals 25 and 27, a scale 29 with numerical surface indicia, and a magnetic curved mount 31 to complementarily fit and hold the scale to the metallic washer gage body. The two wire terminals 25 and 27 span the gage body split and are rigidly held in the holes 13 and 15, respectively, of the washer. In this way when the forces $F_1$ and $F_2$ act on the washer its movement will be transmitted to the movement of the wire pointer 23. The scale over which the wire pointer's free end moves is related to the elastic limits of the deformable washer for it is within these limits that a near linear relationship is found. Should the wire pointer free end move off the scale to a nonlinear region the accuracy of the readings would be in doubt indicating only that a very large force has been placed on the washer and bolt.

The actual washer I have constructed for use with rock bolts usually have center hole sizes of ¾ to 1-¼ diameter to accommodate the standard sized bolt shafts. FIG. 6 shows this hole 33. In such cases the cross-sectional circular area of the washer varies from about 0.2 to 0.45 square inches. While the material the washer is made of should have a good elastic response (i.e., it will elongate before it breaks) and be reasonably firm, the actual material used can vary. Types I have used are hardened 4140 ASTM steel washers that read between 46 to 50 on the Rockwell C hardness scale. Since in a rock bolt it can be expected that 8,000 pounds of force will compress the gage with several hundred thousand psi on the two small bearing surfaces (18 and 20), the material selected to be used must take into consideration these factors.

Figure 7:
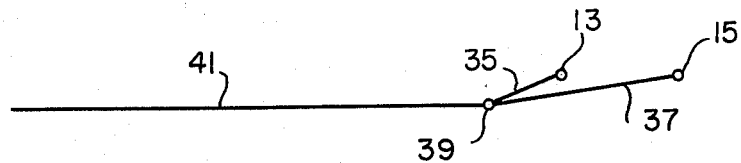
FIGS. 7 and 8 schematically illustrate another embodiment of the indicating pointer device.
Figure 8:
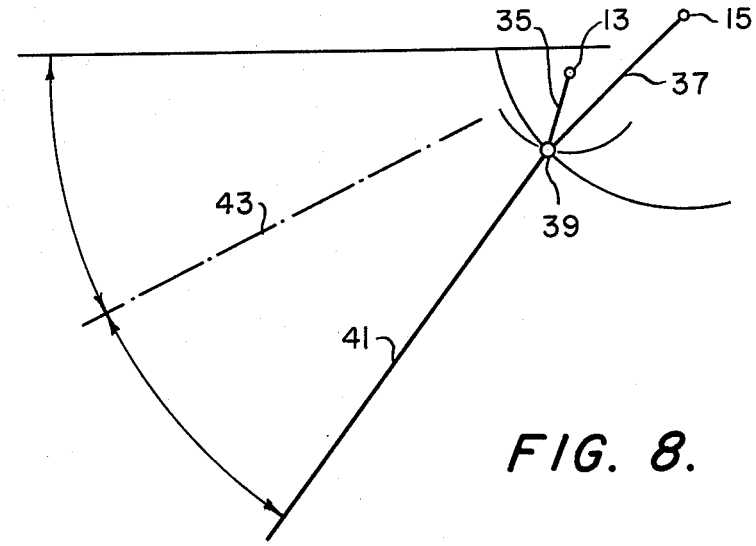

FIGS. 7 and 8 are schematic diagrams of another way of connecting the indicating pointer wire to the washer gage body. The side view of FIG. 7 shows the same two gage holes 13 and 15 of FIG. 5 with wire segments 35 and 37, respectively, rotatably inserted therein. The other two ends of these wire segments join at a common hinge 39. Attached to the hinge is the long rigid straight section of wire pointer 41 similar to wire pointer 23 of the FIG. 5 embodiment. Wire section 43 shown by a dotted or phantom line represents the postion that pointer 41 would assume if hinge 39 did not exist and the long straight section 41 were connected directly to the holes 13 and 15 as in FIG. 5. What I am trying to do in this FIG. 7 embodiment is to exaggerate the movement of the wire indicator once the washer has been deformed pass a certain amount. Thus, should this minimum amount of wire deflection take place, the hinge will bend the wire pointer 41 in a large arch so that an observer can easily tell from a considerable distance that something is wrong and that the bolt is not carrying the required load. To further aid an observer in a darkened mine the arm 41 (or arm 23) can be painted with a bright illuminous color so that when a light is beamed thereon the deflection relative to the scale painted the same way can easily be noted. By this method it is estimated observers from 50 feet or so away from the washer can tell whether the roof bolts of an old worked out mine section are safe to work under and may if safe, begin operations again.

It should be understood that the schematics of FIGS. 7 and 8 are contemplated for use with a gage washer, mount, and scale like or the same as those of the FIG. 5 embodiment. Clearly other types of indicators that relate the deformation of the washer of its compressive forces could also be used. Whatever the modifications, none should be used to limit the scope and extent of my invention which is to be measured only by the claims that follow.

I claim:

1. A combined load gage and indicating device comprising:
    a deformable spiral ring gage body having two outer load bearing surfaces and a split ring section located along the length of the body adjacent said bearing surfaces and therebetween, said section comprising two opposing surfaces of the body each of which is oriented at an angle of between 50 to 62 degrees with respect to its adjacent load bearing gage body surface; and
    a deformation indicating device and scale attached to said gage body to visually indicate the amount of force on said bearing surface.

2. The combination of claim 1 wherein said indicating device comprises an elongated rigid pointer member that is hinged along its length between its free end and the gage body.

* * * * *